United States Patent [19]
Gogarty et al.

[11] 3,818,993
[45] June 25, 1974

[54] LPG MICELLAR SOLUTIONS AS FRACTURING FLUIDS

[75] Inventors: William B. Gogarty, Littleton; Gerald W. Haws, Denver, both of Colo.

[73] Assignee: Marathon Oil Company, Findlay, Ohio

[22] Filed: Jan. 3, 1972

[21] Appl. No.: 214,848

[52] U.S. Cl. ............................ 166/308, 252/8.55 R
[51] Int. Cl. .......................................... E21b 43/26
[58] Field of Search........ 166/305 R, 308, 271, 281, 166/283; 252/8.55 R

[56] References Cited
UNITED STATES PATENTS

| | | | |
|---|---|---|---|
| 2,828,265 | 3/1958 | Van Strien | 252/8.55 R |
| 3,335,794 | 8/1967 | Bond | 166/271 |
| 3,500,932 | 3/1970 | Webb | 166/308 |
| 3,545,546 | 12/1970 | Son, Jr. et al. | 166/305 R |
| 3,557,874 | 1/1971 | Glass et al. | 166/281 |
| 3,603,400 | 9/1971 | Son, Jr. | 166/308 |
| 3,747,681 | 7/1973 | Davis et al. | 166/308 |

OTHER PUBLICATIONS
Frick, "Petroleum Production Handbook", 1963, p. 47–19

*Primary Examiner*—Stephen J. Novosad
*Assistant Examiner*—Jack E. Ebel
*Attorney, Agent, or Firm*—Joseph C. Herring; Richard C. Willson, Jr.; Jack L. Hummel

[57] ABSTRACT

A fracturing fluid successfully useful for stimulating gas producing wells is obtained by mixing 60–95 percent by volume of a hydrocarbon containing an average of C-3 to about C-10 carbon atoms, up to 20 percent by volume of water, 2.5 to about 25 percent of a surfactant obtained by condensing about 1 mole of an alcohol containing about 4 to about 20 carbon atoms with about 1 to about 20 moles of an alkene oxide to obtain a surfactant having a HLB (hydrophil-lipophil balance) of about 3 to about 15, and optionally containing 0.1 to about 10 percent by volume of a cosurfactant which can be an alcohol containing 1 to about 10 carbon atoms and/or about 0.001 to about 5 percent by weight (based on aqueous medium) of an electrolyte. In addition, the fracturing fluid can contain propping agents, fluid loss control agents, corrosion inhibitors, diverting agents, and other additives desired for a particular fracturing process.

13 Claims, 3 Drawing Figures

VISCOSITY VS TEMPERATURE

VISCOSITY VS WATER CONCENTRATION 3,818,993

LPG MICELLAR SOLUTIONS AS FRACTURING FLUIDS

BACKGROUND OF THE INVENTION

1. Field of the Invention

This invention relates to fracturing fluids containing low molecular weight hydrocarbons with correspondingly high vapor pressure and with minimum water concentrations which are particularly useful for fracturing gas producing wells. A particular surfactant which is obtained by condensing an alcohol with an alkylene oxide permits high viscosities of a fracturing fluid. The fracturing fluid is injected in a gas producing well at a sufficient rate to obtain fracturing pressures at the rock face.

2. Description of the Prior Art

Fracturing of gas producing wells with conventional fracturing fluids have generally proved to be ineffective. The main problem is that residual materials from the fracturing fluid remain in the well after treatment and reduce the productivity of the reservoir. For example, when a water-based fracturing fluid is used, the water within the fracturing fluid can form emulsion blocks within the reservoir or the water saturation within the reservoir rock can adversely influence the relative permeability to the flow of the gas. Also, the water can interact with clay in a reservoir and cause formation damage.

It is desired that the fracturing fluid contain components which are capable of being easily removed from the well once the well has been fractured and returned to production. That is, the blow-down of the fractured well desirably removes the components of the fracturing fluid from the reservoir rock without adversely influencing flow characteristics in the reservoir rock.

Of course, the fracturing fluid must have a viscosity sufficient to obtain efficient fracturing of the reservoir and also should have properties sufficient to keep in suspension propping agents. Other desirable properties of the fracturing fluid include low fluid loss characteristics, the fluid being capable of maintaining its viscosity at relatively high temperatures, low fluid loss characteristics to permit efficient pump rates at minimum pressure drops, etc. In the Oil and Gas Journal, July 5, 1971, page 60, there is described a gelled liquid gas useful for fracturing gas wells. The gelled gas contains carbon dioxide, liquid petroleum gases, a gelling material, and a proppant. Viscosities of the gelled liquid gas are about 10 to about 50 cp. at ambient temperature. The gelled gas is useful at bottom hole temperatures of 80°–225°F.

SUMMARY OF THE INVENTION

Applicants have discovered a novel composition useful for fracturing gas wells. This fluid exhibits viscosities up to about 1,000 at ambient temperature and can exhibit viscosities of about 100° at 200°F. The fracturing fluid is composed of a low molecular weight hydrocarbon, up to 20 percent water, but preferably less than 10 percent water, a surfactant which is a condensation product of an alcohol containing 4–20 carbon atoms, and an alkylene oxide, the condensate having an HLB of about 3 to about 15, and the fracturing fluid can optionally contain cosurfactant and/or electrolyte. In addition, propping agents and other additives can be added to the fracturing fluid. If relatively high viscosities are desired, the water concentration is at a minimum.

Curve a: 10 percent of the stock solution plus 90 percent hexane,
Curve b: 9.85 percent of the stock solution, 88.75 percent hexane, and 1.4 percent distilled water.
Curve c: 9.72 percent of the stock solution, 87.51 percent hexane, 2.77 percent distilled water,
Curve d: 9.65 percent of stock solution, 86.91 percent hexane, and 3.44 percent distilled water,
Curve e: 9.58 percent stock solution, 86.32 percent hexane, and 4.10 percent distilled water,
Curve f: 9.52 percent stock solution, 85.72 percent hexane, and 4.76 percent distilled water,
Curve e: 9.45 percent stock solution, 85.15 percent hexane, and 5.4 percent distilled water.

From this curve, it is evident that an increased concentration of water lowers the overall viscosity. All of these curves were obtained by using a Fann Viscometer at 100 rpm.

Figure 1:
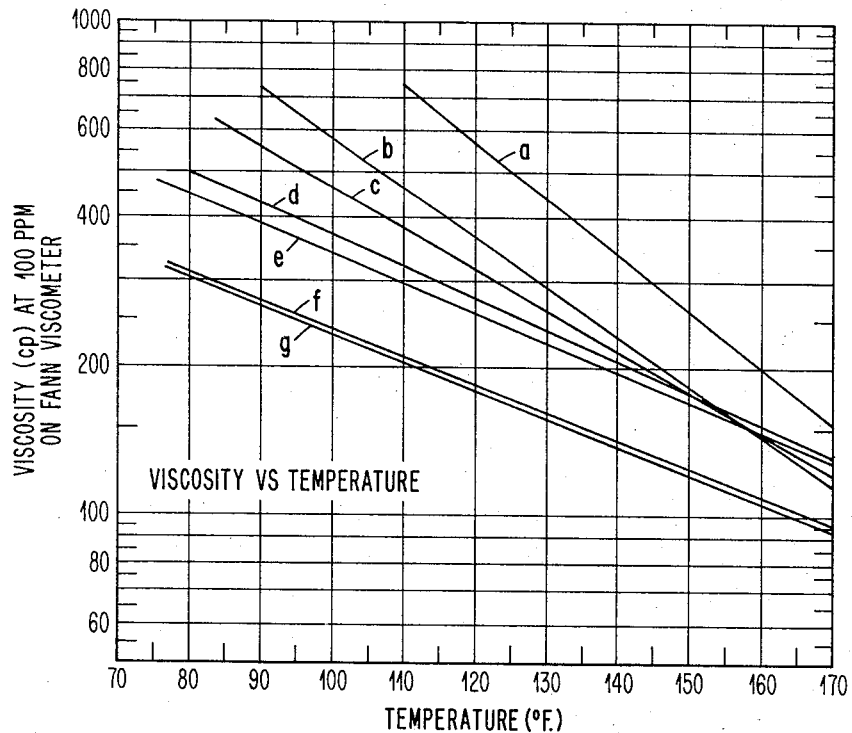
FIG. 1 represents the relationship between viscosity and temperature. As is evident from this Figure, relatively high viscosities can be obtained at relatively high temperatures. The fracturing fluids represented by these particular curves were prepared by mixing a stock solution containing 42 percent by weight of an ethoxylated secondary alcohol obtained by reacting one mole of an alcohol containing 12 to about 14 carbon atoms with about 3 moles of ethylene oxide, 24 percent propylene glycol, and 34 percent water with varying amounts of water and hexane. The curves in this Figure are composed of the following composition.
Figure 2:
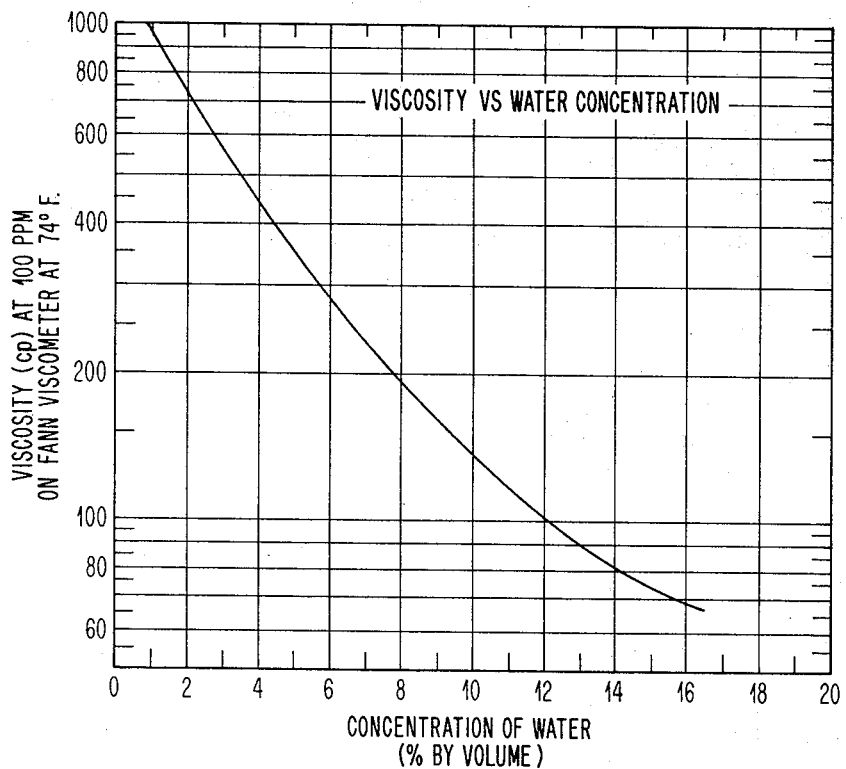

FIG. 2: This curve represents the relationship of viscosity vs. water concentration for a particular fracturing fluid. Data for this curve were obtained using a Fann Viscometer at 100 rpm and operated at 74°F. Water concentrations in FIG. 2 represent the volume percent of water added to a fluid mixture containing 10 percent of the stock solution defined in FIG. 1 and 90 percent hexane. The amounts of distilled water indicate on the curve vary from 1 percent to about 17 percent. This curve again illustrates that very high viscosities are realized at lower water concentrations.

Figure 3:
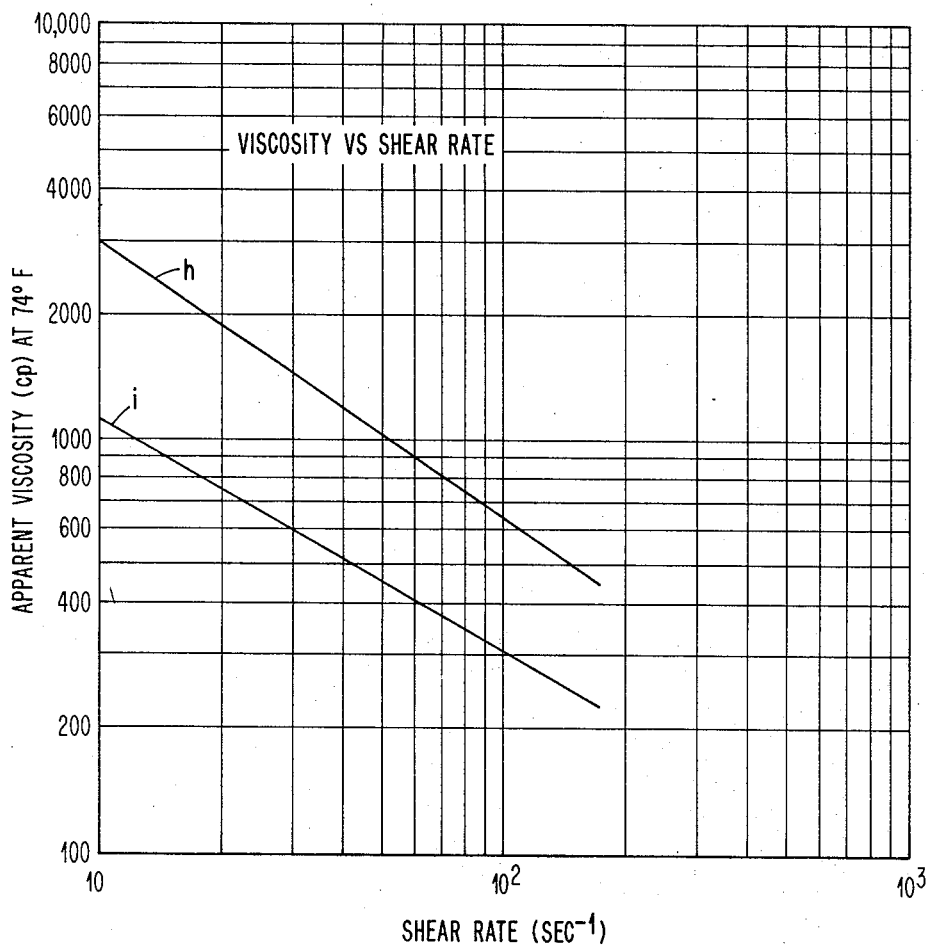

FIG. 3 represents the relationship of viscosity vs. shear rate at 74°F for two different fracturing fluids. Data for these curves were obtained using a cone and plate viscometer operated at varying rpm's to give different shear rates. The shear rates were increased to a certain level and thereafter decreased to the original shear rate—the fracturing fluids are very stable over these shear rates. The curve defined as $h$ represents a fluid composed of 10 percent of the stock solution defined in FIG. 1, and 90 percent hexane. Curve designated $i$ represents a fluid composed of 9.45 percent of the stock solution defined in FIG. 1, 5.42 percent of distilled water and 85.13 percent hexane. The curves show the non-Newtonian character of these particular fluid mixtures; that is, there does not exist a linear relationship between the shear rate and shear stress. Because of this, the apparent viscosity of the liquid decreases with increasing shear rate which is desirable for a fracturing fluid. The high shear rate in the pipe causes a low apparent viscosity and more fluid flows at a given pressure drop than would occur with a corresponding Newtonian fluid. As the fluid enters the formation, the shear rate decreases and the viscosity increases. This condition causes more effective fracturing.

DESCRIPTION OF PREFERRED EMBODIMENTS

The fracturing fluids are composed basically of hydrocarbon and surfactant and optionally water and/or cosurfactant and/or electrolyte. In addition, propping agents, fluid loss control agents, and other desired additives can be incorporated into the fracturing fluid. Depending upon the viscosity desired, and the properties of the fracturing fluid for a particular reservoir to be fractured, the fracturing fluid can be designed to be compatible with particular properties of a particular reservoir. Unless otherwise specified, all percentages are based on volume.

The fracturing fluids are generally composed of from 60 to about 95 percent and preferably about 70 to about 95 percent of a hydrocarbon; about 2.5 percent to about 25 percent, preferably about 3 to about 15 and more preferably about 5 to about 10 percent of a surfactant; optionally up to about 20 percent of water and preferably less than 10 percent water; optionally about 0.01 to about 10 percent and preferably 0.1 to about 5 percent of a cosurfactant and/or about 0.001 to about 5 percent by weight of an electrolyte. The hydrocarbon is preferably a low molecular weight hydrocarbon, for example, having about 3 to about 10 carbon atoms in the molecule. Preferably, the hydrocarbon is volatile at temperatures under 170°F.; however, this will be dependent upon the particular reservoir being fractured but it is desired that the hydrocarbon be volatile at the temperature of the reservoir being fractured so that when the well is returned to production, the hydrocarbon will be easily removed from the well by "blowing-down" the well. Examples of preferred hydrocarbon include liquefied petroleum gases, methane, propane, butane, pentane, hexane, heptane, and decane. Partially refined fractions of crude oil such as straight-run gasoline and other cuts from the crude oil column are useful as the hydrocarbon.

The surfactant is a condensation product of an alcohol containing an average of about 4 to about 20, preferably about 8 to about 16 and more preferably about 10 to about 14 carbon atoms. The alcohol can be a primary, secondary, or tertiary alcohol and can be aliphatic or aromatic. In addition, the alcohol can be branch-chained, and can have aryl groupings on the molecule. The alcohol is condensed with about 1 to about 20, preferably 2 to about 10, more preferably 3 to about 5 moles of an alkene oxide. The condensation product of the alcohol and the alkene oxide preferably contain about 20 to about 75 percent, more preferably about 30 to about 60 percent and most preferably about 40 to about 50 percent by weight of the alkene oxides. The alkene oxide is preferably a low molecular weight oxide, e.g., ethylene oxide, propylene oxide, and butylene oxide. An example of a commercially available surfactant especially useful with Applicant's fracturing fluids includes Plurafac A-24—this is a trademark of Wyandotte Chemical Corp., Wyandotte, Mich., and identifies a condensation product obtained by reaction an alcohol containing about 10 to about 18 carbon atoms with ethylene oxide to give an average of about 40 percent by weight of ethylene oxy groups in the condensate product. The surfactant preferably has a hydrophil-lipophil balance, hereinafter referred to as HLB, of 3 to about 15 and more preferably about 4 to about 8. The particular HLB is desired to obtain a more stable fracturing fluid.

The cosurfactant can optionally be incorporated into the fracturing fluids to impart additional stability to the fracturing fluid as well as impart viscosity characteristics. The cosurfactant can be an aldehyde, ketone, amine, ester, and alcohol, or like hydrocarbon compound containing equivalent functional groups. The cosurfactant contains from about 1 to about 10 or more, and preferably about 2 to about 4 carbon atoms in the molecule. More preferably, the cosurfactant is a polyhydroxy compound such as propylene glycol.

Electrolyte can be present in the aqueous phase of the fracturing fluid if water is desired. Concentrations of about 0.001 to about 5 percent and preferably about 0.01 to about 3 percent by weight, based on the aqueous medium in the fracturing fluid, are desired. Also, the electrolyte must be compatible with the components of the fracturing fluid as well as with the salt within the intersititial water. If relatively high viscosities of the fracturing fluid are desired, it is preferred that the electrolyte concentration be minimum. The electrolyte can be an inorganic acid, inorganic base, or inorganic salt.

Preferably, the fracturing fluid contains propping agents. Concentrations of about 0.1 to about 5 lb. and preferably about 0.5 to about 3 lb. per gallon of fracturing fluid are desired with this invention. However, the concentration of the propping agent will necessarily depend upon the property of the fracturing fluid to keep in suspension the propping agent and also the desired concentration of propping agent for a particular reservoir to be fractured. Thus, the concentration of propping agent can be lower or higher than the above figures. Examples of useful propping agents include glass beads, metallic particles, preferably sand having a mesh size of 20–40.

In addition, fluid loss control agents which are preferably compatible with the hydrocarbon phase can be added to the fracturing fluid. Examples of such agents compatible with the hydrocarbon phase include oil-soluble, high molecular weight polymers such as polyisobutylene. Where water is present in the fracturing fluid, the fluid loss control agent can be silica flour (200 mesh silica sand), Atomite M-2 (ground calcium carbonate having diameters less than 15 micron, manufactured and marketed by Thompson, Weinman and Co., Cartersville, Georgia, and like materials. Silica flour is preferred.

Applicants' fracturing fluids generally exhibit viscoelastic properties which result in the drag reduction phenomena. Such permits a larger volume of liquid to be pumped down a well bore in a given time with the available pressure. This condition causes more effective fracturing at the rock face. Where the reservoir to be fractured is susceptible to water damage, it is preferred that the fracturing fluid contain minimum water concentration or zero water concentration. Also, where the reservoir is at a relatively lower temperature, then the molecular weight of the hydrocarbon is desirably low to permit vaporization of the hydrocarbon at the particular reservoir temperature. Such permits components of the fracturing fluid to be easily removed from the well wherein the production well is turned back into production. Also, the components of the fracturing fluid desirably have properties which permit them to change into a gaseous state when conditions equalize at the formation temperature and pressure.

If desired, diverting agents such as coal tar derivatives, naphthenic compounds, steel balls encased in wells, etc., can be used intermittently during the fracturing process to obtain a more uniform fracturing profile in a heterogeneous formation. For example, in a cased well, sealer balls can be intermittently injected into the fracturing fluid to seal off fractures previously created. By this method, a more uniform fracturing profile can be effected. Where the formation is characteristics of a homogeneous strata, then the diverting agents may not be desired.

As mentioned earlier, other additives such as corrosion inhibitors, bactericides, etc., can be incorporated into the fracturing fluid. Of course, it is desired that such additives are compatible with the components of the fracturing fluid and not adversely influence the properties of the fracturing fluid.

WORKING EXAMPLES

The following examples are presented to specifically teach working embodiments of the invention. These examples are presented in addition to those illustrated in the attached figures.

EXAMPLE I

A fracturing fluid is obtained by mixing 10 percent by volume of a composition containing 34 percent by weight tap water, 24 percent by weight propylene glycol and 42 percent by weight of Plurafac A-24, with 90 percent by volume of hexane. The resulting composition is clear and has a viscosity of about 1,000° cp at 72°F.

EXAMPLE II

To show the criticality of the surfactant, the above composition is duplicated except the Plurafac A-24 is substituted with a condensation product obtained by reacting about 1 mole of an alcohol containing an average of about 24 carbon atoms with sufficient ethylene oxide to obtain a condensation product containing about 80 percent by weight of ethylene oxy groups in the condensation products—the condensation product has an HLB of 20. This particular composition did not produce a viscous system, i.e., the viscosity was less than about 1 cp at 72°F. This example also illustrates the criticality of the HLB, i.e., Example I contains a surfactant having an HLB of about 6 whereas the HLB of Example II's surfactant is about 20.

EXAMPLE III

The fracturing fluid is obtained by mixing 9.45 percent by volume of the stock solution identified in FIG. 1 with 85.13 percent hexane, and 5.42 percent distilled water. Thereafter there is added 3 lb/gal of silica flour to the fracturing fluid. The fluid loss characteristics of this particular fracturing fluid at 74°F. measured by the test procedure defined in API RP-13B, second edition, April, 1969, but with the resistivity cell defined in U.S. Pat. No. 3,617,869 to Beitel et al. and operated at 850 psig. is 644 milliliters per 1/2 hour. A "Specially Hardened Filter Paper for Baroid Filter Processes," Catalog No. 988, 2 1/2 inc. diameter, marketed by Baroid Division, National Lead Co., Houston, Tex., was used as the filter paper.

EXAMPLE IV

To test the characteristics of these systems to keep in suspension propping agents, the "drop rate" was determined for a fracturing fluid containing 10 percent of the stock solution of FIG. 1, and 90 percent hexane, and for a second fluid which contains 5.42 percent distilled water, 9.45 percent of the stock solution of FIG. 1, and 85.13 percent hexane. Following the procedure of observing the time required for a 10 mesh glass bead to drop through the fluid contained in a 200 ml. graduated cylinder, the drop rate for both fluids was essentially zero over a time period of 1 hour.

EXAMPLE V

The fluid loss properties of Fluid No. 1 in Example IV were determined. To this was added 3 lb of silica flour per gallon of Fluid 1. Following the previously described fluid loss procedure, the fluid loss properties of this fluid are 480 ml per 1/2 hour. In addition, the fluid remains stable. That is, no phase separation was indicated.

EXAMPLE VI

The pumpabilities of Fluids 1 and 2 of Example IV were determined from a mathematical relationship based on data obtained at 74°F from a capillary tube of 30.33 centimeter length and 0.003365 centimeter in radius. These data were fed to a computer program from which the pumpability of the fluid was determined. The pumpability of Fluid 1 was determined to be 286 cp while the pumpability of Fluid 2 was determined to be 49 cp.

It is not intended that the specifics taught above limit the invention. Rather, all equivalents obvious to those skilled in the art are intended to be incorporated within the scope of the invention as defined in the specification and appended claims.

What is claimed is:

1. A process of fracturing a gas producing well wherein substantially all of the components of a fracturing fluid are removed from the well bore after the well is returned to production, the process comprising injecting into the reservoir at a pressure sufficient to fracture the reservoir, a composition obtained by mixing:
   1. about 60 to about 95 percent by volume of a hydrocarbon containing an average of about 3 to about 10 carbon atoms per molecule,
   2. up to about 20 percent by volume of water, and
   3. about 2.5 to about 25 percent by volume of a surfactant obtained by condensing an alcohol containing an average of about 4 to about 20 carbon atoms per molecule with about 1 to about 20 moles of an alkene oxide, and thereafter injecting the fracturing fluid into the reservoir at a sufficient rate to effect fracturing of the reservoir.

2. The process of claim 1 wherein the hydrocarbon of the fracturing fluid contains an average of about 4 to about 7 carbon atoms per molecule.

3. The process of claim 1 wherein the fracturing fluid contains less than 10 percent by volume of water.

4. The process of claim 1 wherein the fracturing fluid contains a surfactant obtained by condensing an alcohol containing an average of about 10 to about 14 carbon atoms with about 1 to about 20 moles of ethylene oxide.

5. The process of claim 1 wherein the alkene oxide contains about 2 to about 4 carbon atoms.

6. The process of claim 1 wherein the fracturing fluid contains about 0.01 to about 10 percent by volume of a cosurfactant which is selected from the group consisting of alcohols, ketones, aldehydes, esters, amines, which contain about 1 to about 10 carbon atoms per molecule.

7. The process of claim 1 wherein the water phase of the fracturing fluid contains about 0.001 to about 5 percent by weight of electrolyte.

8. The process of claim 1 wherein the fracturing fluid contains about 0.1 to about 5 lbs of a propping agent per gallon of fracturing fluid.

9. The process of claim 5 wherein the propping agent is sand having a mesh size of about 20 to about 40.

10. The process of claim 1 wherein the fracturing fluid contains a fluid loss agent.

11. The process of claim 10 wherein the fracturing fluid contains about 0.001 to about 6 lb of silica flour per gallon of fluid.

12. The process of claim 10 wherein the fracturing fluid contains an oil-soluble, high molecular weight polymer.

13. The process of claim 12 wherein the high molecular weight oil-soluble polymer is a polyisobutylene.

* * * * *